(12) United States Patent
Su et al.

(10) Patent No.: US 7,600,062 B2
(45) Date of Patent: Oct. 6, 2009

(54) METHOD AND APPARATUS FOR MICRO-CODE EXECUTION

(75) Inventors: Ching-Hua Su, Ping-Tung Hsien (TW); Hsin-Hung Chen, Hua-Lien Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 7 days.

(21) Appl. No.: 11/276,318

(22) Filed: Feb. 24, 2006

(65) Prior Publication Data

US 2007/0220240 A1   Sep. 20, 2007

(51) Int. Cl.
*G06F 9/22* (2006.01)
*G06F 9/40* (2006.01)

(52) U.S. Cl. .................. 710/72; 710/5; 710/8; 710/11
(58) Field of Classification Search .................. 370/77; 711/112, 158, 4; 712/242, 243
See application file for complete search history.

(56) References Cited

U.S. PATENT DOCUMENTS

| 4,928,192 | A | * | 5/1990 | Bartlett et al. | ........... 360/77.08 |
|---|---|---|---|---|---|
| 5,661,848 | A | * | 8/1997 | Bonke et al. | ................. 711/112 |
| 6,170,043 | B1 | * | 1/2001 | Hu | ............................... 711/158 |
| 6,212,632 | B1 | * | 4/2001 | Surine et al. | ..................... 713/2 |
| 6,598,135 | B1 | * | 7/2003 | MacLeod | ..................... 711/163 |
| 6,785,762 | B2 | * | 8/2004 | Takahashi et al. | ............... 711/4 |
| 7,027,717 | B1 | * | 4/2006 | Tsujii et al. | .................... 386/96 |
| 7,146,412 | B2 | * | 12/2006 | Turnbull | ....................... 709/220 |
| 2004/0005137 | A1 | * | 1/2004 | Chang | .......................... 386/46 |
| 2004/0125721 | A1 | * | 7/2004 | Hanes | ..................... 369/53.22 |
| 2005/0114717 | A1 | * | 5/2005 | Chen | .......................... 713/300 |
| 2005/0265266 | A1 | * | 12/2005 | Wen et al. | .................... 370/286 |
| 2007/0089109 | A1 | * | 4/2007 | Fontijn | ....................... 717/177 |

OTHER PUBLICATIONS

Patterson et al. Computer Organization and Design, 2005, Morgan Kaufmann, 3rd, p. 473.*
WMware, Workstation 4 User's Manual, 2003, VMware Inc, pp. 11-12.*
Sony, Video Recordable DVD Drive Operation Instructions, 2005, pp. 11, 46-48.*

* cited by examiner

*Primary Examiner*—Henry W. H. Tsai
*Assistant Examiner*—Cheng-Yuan Tseng
(74) *Attorney, Agent, or Firm*—Thomas, Kayden, Horstemeyer & Risley

(57) ABSTRACT

A method for micro-code execution for an electronic device is disclosed. The method includes: providing the electronic device with a micro-code partitioned into a main core and at least a function code, the micro-code being stored in a first storage module of the electronic device; and when the electronic device is powered on, loading the main core from the first storage module into a second storage module of the electronic device, and switching between the second storage module for executing the main core and the first storage module for executing the function code to control operation of the electronic device. The function code is executed when called by execution of the main core.

18 Claims, 4 Drawing Sheets

METHOD AND APPARATUS FOR MICRO-CODE EXECUTION

BACKGROUND OF THE INVENTION

1. Field of the Invention

The present invention relates to micro-code execution, and more specifically, to micro-code execution within optical disc drive systems.

2. Description of the Prior Art

It is very common for most computer users to upgrade, uninstall, and install software components. Methods exist to help facilitate the upgrade of hardware components of the personal computer and its associated peripheral devices by utilizing the so-called micro-code which is also known as firmware.

Please refer to FIG. 1. As shown in FIG. 1, the computer 110 is connected to the CD-ROM drive 160, and the CD-ROM drive 160 includes a disc 100, a controller 150, a decoder (DEC) 120, a microprocessor 130, a non-volatile memory 140, and a buffer memory 125. The non-volatile memory 140 is connected to the microprocessor 130 and is used for storage of all of the micro-code utilized by the CD-ROM drive 160. The buffer memory 125 is connected to the DEC 120 and is used for temporarily storing data such as a micro-code upgrade data.

Please refer to FIG. 2 as well as FIG. 1. FIG. 2 is a diagram illustrating the micro-code stored in the non-volatile memory 140. During operating mode, the microprocessor 130 accesses the micro-code section 210 of the non-volatile memory 140. When detecting that it is necessary for micro-code upgrading, the microprocessor 130 runs the upgrade program section 200 of the micro-code stored in the non-volatile memory 140, and begins executing the upgrade program. The upgrade program is responsible for moving the new version of the micro-code that is currently stored in the buffer memory 125 to a storage space located within the micro-code section 210 of FIG. 2. Finally, the microprocessor 130 resets in order to execute the new version of the micro-code.

It is important to note that the execution speed of microprocessor 130 is greater than the speed at which the microprocessor 130 is able to fetch code from the non-volatile memory 140. Therefore, because all of the micro-code is executed in non-volatile memory 140, and due to the processing versus fetching speed differences, the entire system performance of the CD-ROM drive 160 is reduced. Moreover, when updating the micro-code, the microprocessor 130 cannot have simultaneous read and write access to the non-volatile memory 140. Therefore, it is obvious that improvements in the micro-code execution apparatus 160 to solve the above mentioned disadvantages would be advantageous.

SUMMARY OF THE INVENTION

Therefore, one of the objectives of the claimed invention is to provide a method and apparatus for micro-code execution for an electronic device by switching between a main core stored in a first storage module and a function code stored in a second storage module, to solve the above problems.

According to an embodiment of the claimed invention, a method for micro-code execution for an electronic device is disclosed. The method comprises: providing the electronic device with a micro-code partitioned into a main core and at least a function code, the micro-code being stored in a first storage module of the electronic device; and when the electronic device is powered on, loading the main core from the first storage module into a second storage module of the electronic device, and switching between the second storage module for executing the main core and the first storage module for executing the function code to control operation of the electronic device; wherein the function code is executed when called by execution of the main core.

According to an embodiment of the claimed invention, a micro-code execution device is disclosed. The electronic device comprises: a first storage module storing a micro-code partitioned into a main core and at least a function code; a second storage module; and a microprocessor, electrically connected to the first storage module and the second storage module, for loading the main core from the first storage module into the second storage module and for switching between the second storage module for executing the main core and the first storage module for executing the function code to control operation of the electronic device when the electronic device is powered on, wherein the function code is executed when called by execution of the main core.

These and other objectives of the present invention will no doubt become obvious to those of ordinary skill in the art after reading the following detailed description of the preferred embodiment that is illustrated in the various figures and drawings.

DETAILED DESCRIPTION

To increase the system performance of the micro-code execution apparatus, such as an optical disc drive, and to prevent the problems described above that occur when updating micro-code when utilizing prior art techniques, it is advantageous to utilize the method and apparatus disclosed here to execute the micro-code. By way of example, and not limitation, the present invention is illustrated utilizing an exemplarily embodiment comprising an optical disc drive, the optical disc drive's micro-code, and the relevant components of an overall computing environment.

Figure 1:
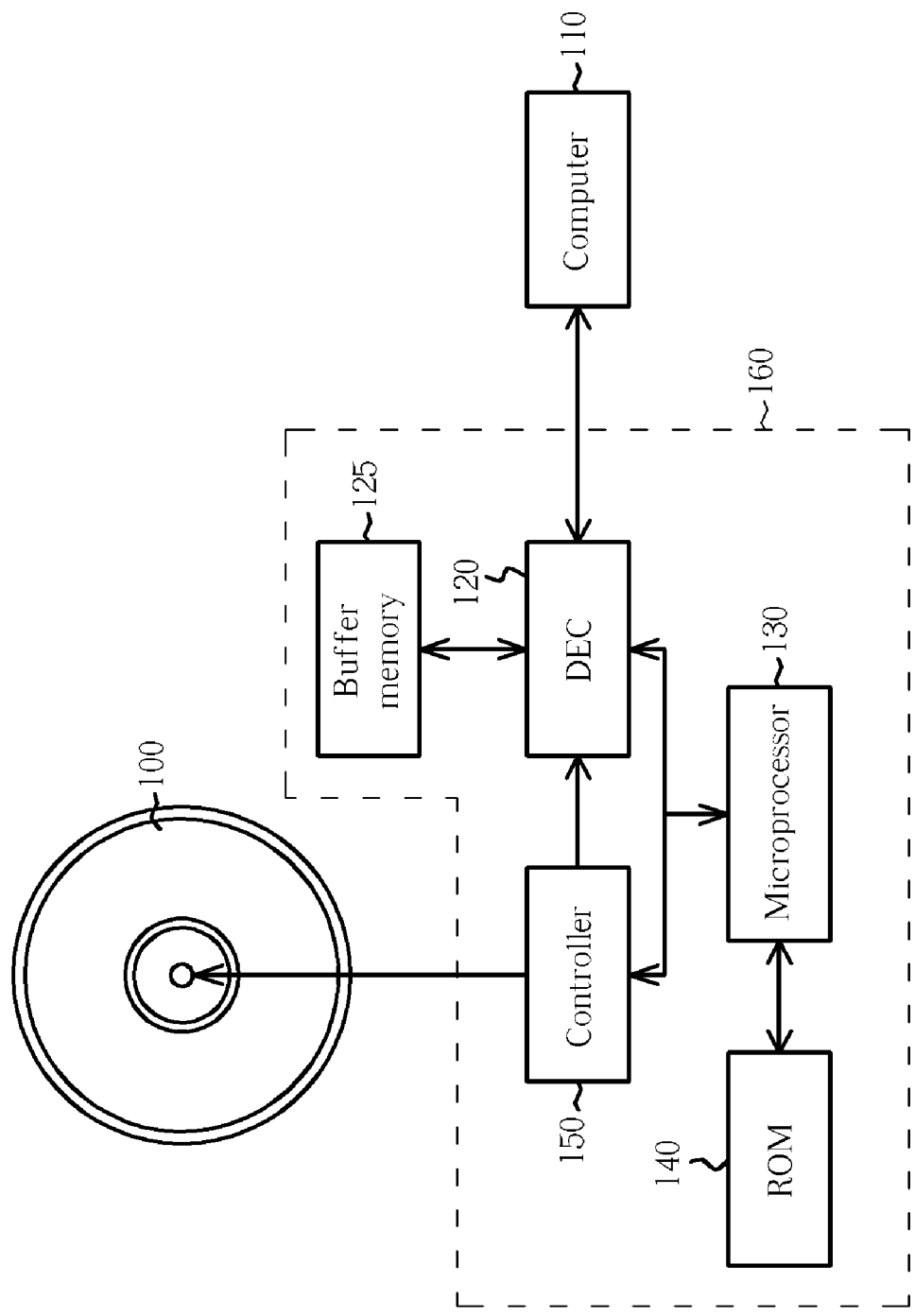
FIG. 1 is a block diagram of a micro-code execution apparatus according to the prior art.
Figure 2:
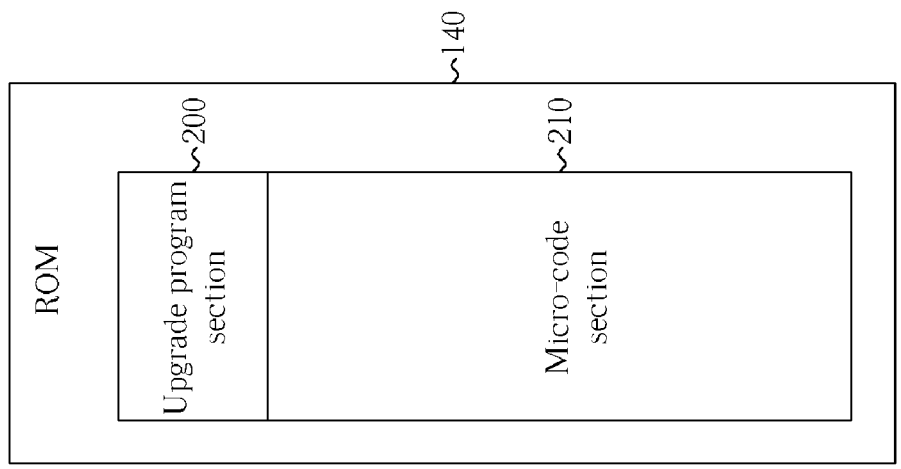
FIG. 2 is a diagram illustrating micro-code stored in the memory shown in FIG. 1.
Figure 3:
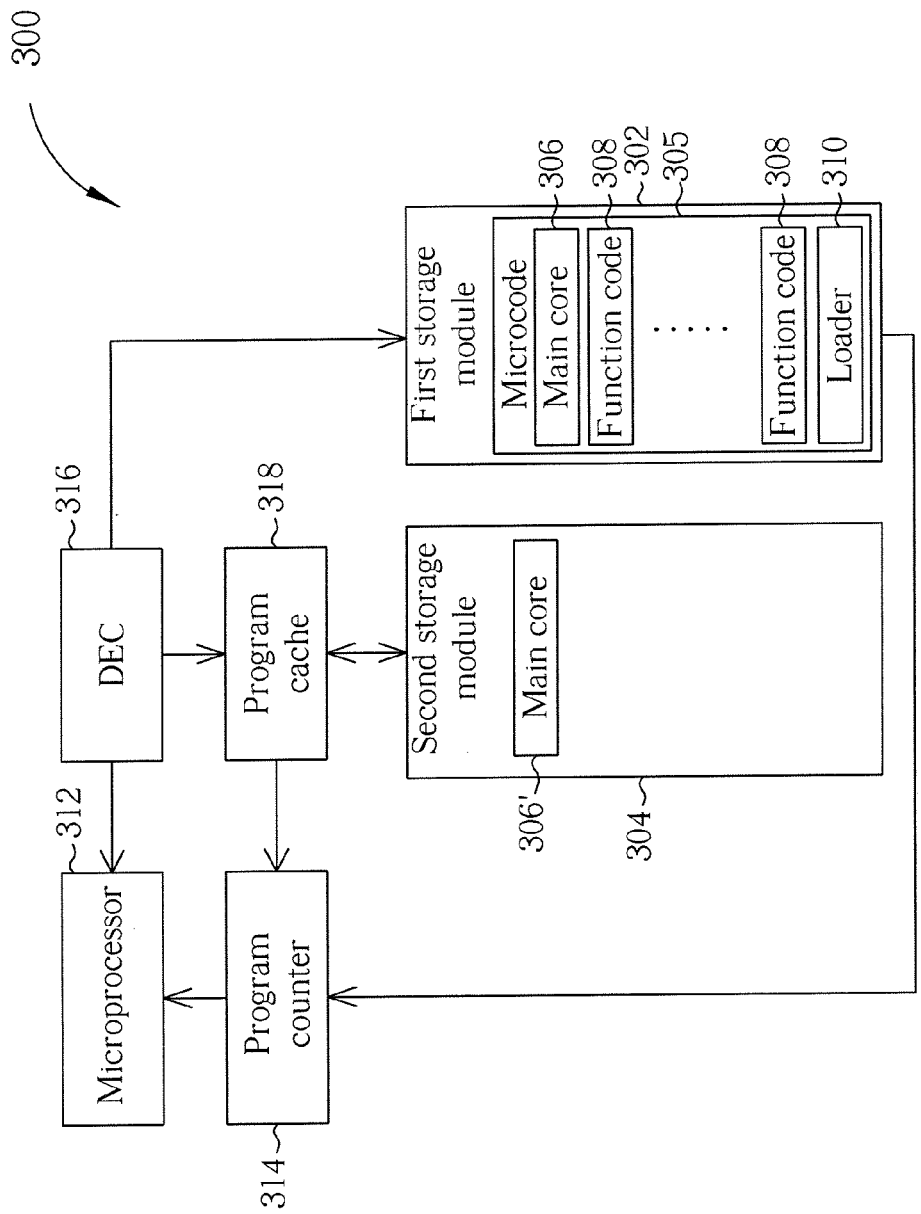
FIG. 3 is a block diagram of an optical disc drive according to an embodiment of the present invention.

Please refer to FIG. 3. FIG. 3 is a block diagram of an optical disc drive 300 according to an embodiment of the present invention. As shown in FIG. 3, the optical disc drive 300 includes a first storage module 302, a second storage module 304, a microprocessor 312, a program counter 314, an address decoder (DEC) 316, and a program cache 318. In this embodiment, the first storage module 302 is implemented by non-volatile memory such as a flash ROM, and the second storage module 304 is implemented by volatile memory such as DRAM. The micro-code of the optical disc drive 300, i.e. micro-code 305, is stored in the first storage module 302. The micro-code 305 is primarily divided into a main core 306, a plurality of function codes 308, and a loader 310. The main core 306 contains the elements like a main routine, an update program, etc. In addition, each function code 308 corresponds to a specific function for a specific disc type, for example, a servo start-up function for CD-R disc, a servo start-up function for DVD-R disc, a seek function for CD-R disc, a seek function for DVD-R disc, and other disc drive related functions. Note that a loader 310 is also stored in the first storage module 302 and is executed to load the main core 306 into the second storage module 304 such that a duplicated main core 306' is buffered in the second storage module 304. The data structure of the micro-code 305 is programmable. For instance, the designer can determine the total number of function codes 308 and the specific functions of the implemented function codes 308 according to design requirements. That is, the designer can consider factors relevant to the system performance of the optical disc drive 300, and the system performance can be optimized by determining which function codes are executed frequently. Additionally, the performance of the micro-code execution is affected by the core size. Therefore, it is important to consider which function codes must necessarily be integrated into the main core 306 and which function codes should become independent functions as function codes 308 shown in FIG. 3. The micro-code execution in the optical disc drive 300 is detailed as follows.

Figure 4:
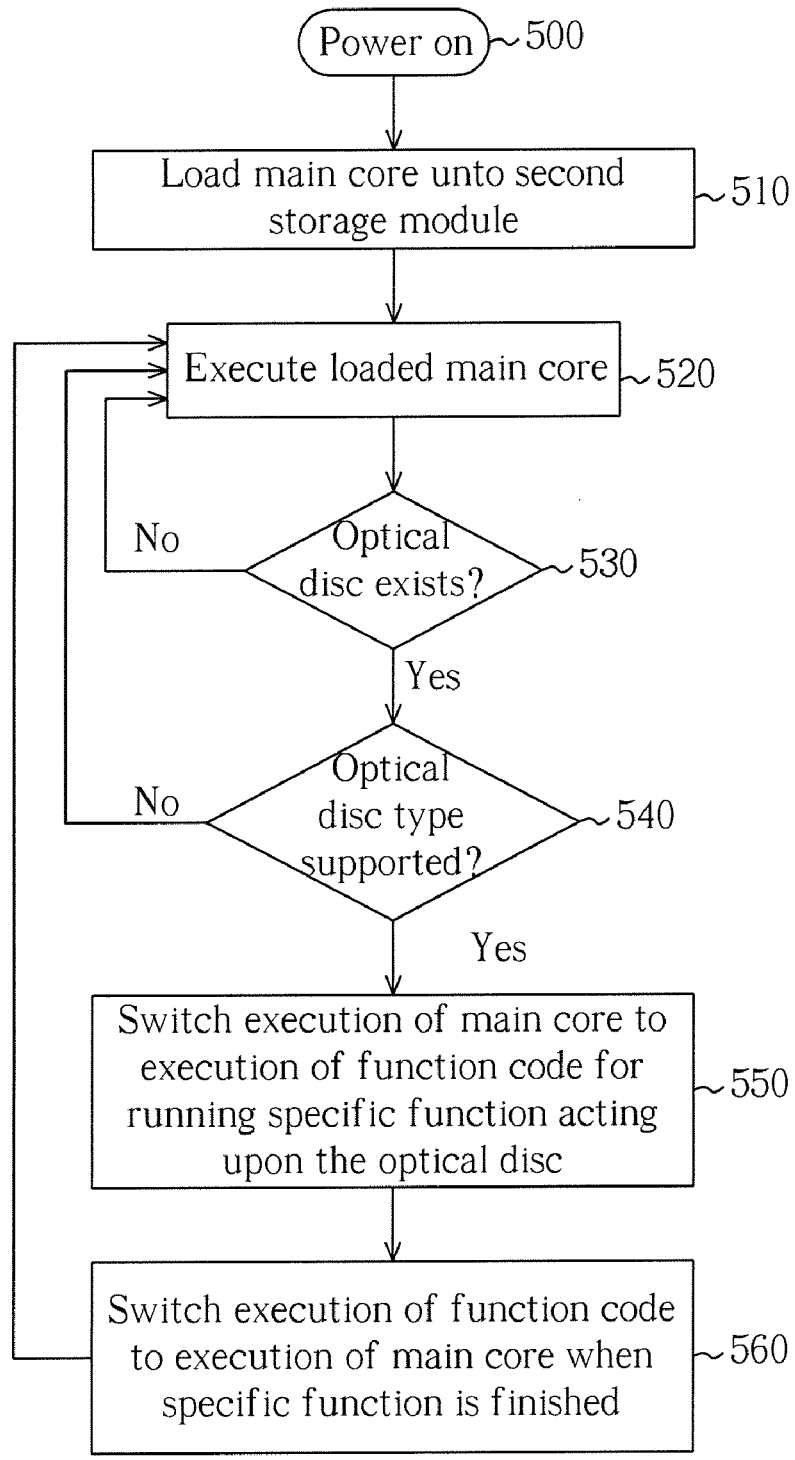
FIG. 4 is a flowchart showing the micro-code execution of the optical disc drive shown in FIG. 3.

Please refer to FIG. 4 in conjunction with FIG. 3. FIG. 4 is a flowchart showing the micro-code execution of the optical disc drive 300. The micro-code execution includes the following steps:

Step 500: Power on the optical disc drive 300.

Step 510: Load the main core 306 from the first storage module 302 into the second storage module 304.

Step 520: Execute the loaded main core 306' in the second storage module 304 to control operation of the optical disc drive 300.

Step 530: Check if an optical disc exists? If yes, then continue with the flow and go to step 540, if no, return to step 520.

Step 540: Check the type of inserted optical disc to see if the optical disc type is supported. If yes, then continue with the flow and go to step 550, if no, return to step 520.

Step 550: When a command is received from a host, execute the main core 306' to switch execution of the main core 306' to execution of a selected function code 308 in the first storage module 302 for running a specific function acting upon the optical disc.

Step 560: Switch execution of the selected function code 308 to execution of the main core 306' when the specific function acting upon the optical disc is finished, and then go to step 520.

When the optical disc drive 300 boots up, the program counter 314 locates an appropriate memory address and the microprocessor 312 refers to the memory address pointed to by the program counter 314 for executing the loader 310 in the first storage module 302 (step 500). Please note that micro-code 305 of the optical disc drive 300 is executed by the microprocessor 312 to perform its designed functionality. That is, the microprocessor 312 dominates the operation of the optical disc drive 300 by executing the micro-code 305. In this embodiment, this loader 310 executed by the microprocessor 312 will transmit the main core 306 to a predetermined address of the second storage module 304 through PIO or DMA mode (step 510). When finished copying the main core 306, the loader 310 will then switch the program counter 314 to the starting address of the main core 306' that was copied to the second storage module 304 (step 520). At the same time, the optical disc drive 300 is completely booted-up and begins to operate according to execution of the main core 306'. Then, the microprocessor 312 executes the main core 306' to keep monitoring if an optical disc is inserted (step 530). If the optical disc exists, the microprocessor 312 executes the main core 306' to check the type of the inserted optical disc (step 540). If the type of the inserted optical disc is supported by the optical disc drive 300, the optical disc drive 300 waits for commands issued by a host (e.g., the computer host). When the host generates a command for accessing the inserted optical disc, for example, a "read" command for a CD-R disc, the main core 306' executed by the microprocessor 312 searches the first storage module 302 for a target function code 308 designed to handle data reading of CD-R discs, and then calls the target function code 308. In other words, the microprocessor 312 switches execution of the main core 306' to execution of the selected function code 308 in the first storage module 302 for reading data on the CD-R disc in response to the received "read" command (step 550). When data requested by the "read" command have been obtained from the CD-R disc, the microprocessor 312 switches execution of the selected function code 308 to execution of the main core 306' to terminate the "read" operation, and waits for following commands from the host (step 560). Thereafter, the main core 306' will execute the same jump action, i.e., steps 550 and 560, when calling functions. That is, as the host generates a command for accessing the inserted optical disc, for example, a "write" command for CD-R disc, the main core 306' executed by the microprocessor 312 calls another target function code 308 designed to handle data recording of CD-R disc. In short, when a specific function, which is not supported by the main core 306', is needed, the switching between the first and second storage modules 302, 304 occurs for execution in the first storage module 302 to run the desired function code 308 designed to perform the needed function.

Based on this mechanism it is possible to combine the DEC 316 to instruct the microprocessor 312 to fetch program code in the second storage module 304 or the first storage module 302. In other words, the DEC 316 and the program counter 314 are components used to help the microprocessor 312 to execute program codes. Additionally, the program cache 318 is implemented to increase the program code executing speed of the main core 306' buffered in the second storage module 304. The frequently executed command sets of the main core 306' are cached in the program cache 318. In other words, the program cache 430 can increase the hit rate when caching the frequently executed command sets of the main core 306'. Therefore, when a target command set of the main core 306' is to be executed again, the microprocessor 312, as known to those skilled in this art, directly executes the cached target command set instead of the target command set read from the second storage module 304.

As mentioned above, during the micro-code execution, the main core 306 is buffered in the second storage module 304 and executed from the second storage module 304 independent from the first storage module 302. In this embodiment, the main core 306, 306' comprises the update function. Therefore, when the optical disc drive 300 detects a request for updating the micro-code 305, the microprocessor 312 running the current micro-code 305 will notify the program counter 314 and cause the program counter 314 to jump to the update program of the main core 306'. The update program is executed by the microprocessor 312, meanwhile, micro-code updating takes place in the first storage module 302, therefore the present invention will prevent a simultaneous read and write operation occurring in the flash ROM during the micro-code updating process. As a result, this greatly improves the micro-code updating efficiency.

In summary, the present invention provides a method for micro-code execution for an electronic device such as an optical disc drive. The present invention executes the main core in the second storage module (e.g. DRAM) to achieve better executing performance, makes use of the program cache to further increase the executing performance of the main core in the second storage module, eliminates inefficiency of executing the main core completely in the first storage module (e.g. flash ROM), and finally, the present invention prevents simultaneous read operations for accessing the main core and write operations for updating the micro-code.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for micro-code execution, comprising the steps of:
    loading a main core of a micro-code from a first storage module into a second storage module of an electronic device;
    switching execution between the second storage module for executing the main core and the first storage module for executing one or a plurality of function codes of the micro-code to control operation of the electronic device; the main core being executed from the second storage module, and the function code or the function codes being stored in and executed from the first storage module, each of the function codes corresponding to a type of a storage medium;
    executing an update program in the main core from the second storage module to update the micro-code stored in the first storage module when data of the micro-code is to be updated;
    executing the main core to monitor for receiving a command issued by a host;
    executing the main core to check a type of a storage medium;
    when the type is determined as a specific type and the corresponding function code is required to act upon the storage medium, switching execution of the main core to execution of the function code; and
    after the corresponding function code acting upon the storage medium is finished, switching execution of the function code to execution of the main core;
    wherein the function code or the function codes are executed when called by execution of the main core in the second storage module after the electronic device has completely booted.

2. The method of claim 1, wherein the first storage module is non-volatile memory.

3. The method of claim 1, wherein the second storage module is volatile memory.

4. The method of claim 1 further comprising the steps of: separately caching a target command set of the main core read from the second storage module when executing the target command set; and when the target command set is to be executed again, directly executing the cached target command set instead of the target command set from the second storage module.

5. The method of claim 1, wherein the electronic device is a disc drive.

6. The method of claim 5, wherein the micro-code is firmware of the disc drive.

7. The method of claim 5, wherein the storage medium comprises a disc and the type comprises a disc type.

8. An electronic device comprising:
    a first storage module storing a micro-code partitioned into a main core and at least a function code;
    a second storage module; and
    a microprocessor, coupled to the first storage module and the second storage module, for loading the main core from the first storage module into the second storage module and for switching execution between the second storage module for executing the main core and the first storage module for executing the function code to control operation of the electronic device; the main core being executed from the second storage module, and the function code or the function codes being stored in and executed from the first storage module;
    wherein the function code is executed when called by execution of the main core after the electronic device has completely booted, wherein the micro-code includes a plurality of function codes each corresponding to a type of a storage medium, wherein the main core comprises an update program, wherein the microprocessor is configured to execute the update program of the main core read from the second storage module to update the micro-code stored in the first storage module when data of the micro-code is to be updated, wherein the microprocessor executes the main core to monitor for receiving a command issued by a host, and wherein the microprocessor executes the main core to check a type of a storage medium, switches execution of the main core to execution of the function code when the type is determined as a specific type and the corresponding function code is required to act upon the storage medium, and switches execution of the function code to execution of the main core when the corresponding function code acting upon the storage medium is finished.

9. The electronic device of claim 8, wherein the first storage module is non-volatile memory.

10. The electronic device of claim 8, wherein the second storage module is volatile memory.

11. The electronic device of claim 8 further comprising: a program cache, coupled with the second storage module and the microprocessor, for caching a target command set of the main core read from the second storage module when executing the target command set; wherein when the target command set is to be executed again, the microprocessor directly executes the cached target command set instead of the target command set from the second storage module.

12. The electronic device of claim 8 being a disc drive.

13. The electronic device of claim 12, wherein the micro-code is firmware of the disc drive.

14. The electronic device of claim 12, wherein the storage medium comprises a disc and the type comprises a disc type.

15. A micro-code execution method for an electronic device, the electronic device comprising a first storage module and a second storage module, the first storage module for storing a micro-code partitioned into a loader, a main core and a plurality of function codes, each of the function codes corresponding to a type of a storage medium, the method comprising the steps of:
    executing the loader to load the main core from the first storage module into the second storage module;
    executing the main core in the second storage module to monitor for receiving a command issued by a host;
    executing the main core to check a type of a storage medium;
    when the type is determined as a specific type and the corresponding function code is required to act upon the storage medium, switching execution of the main core to execution of the function code; and
    after the corresponding function code acting upon the storage medium is finished, switching execution of the function code to execution of the main core;
    executing an update program of the main core in the second storage module to update the micro-code stored in the first storage module when data of the micro-code is to be updated;

wherein the main core is executed from the second storage module, and the corresponding function code is stored in and executed from the first storage module; and the function code is executed when called by execution of the main core after the electronic device has completely booted.

16. The method of claim 15, wherein the first storage module is non-volatile memory and the second storage module is volatile memory.

17. The method of claim 15 further comprising the steps of:

separately caching a target command set of the main core read from the second storage module when executing the target command set; and executing the cached target command set instead of the target command set from the second storage module when the target command set is to be executed again.

18. The method of claim 1, further comprising:

based on the command, switching execution between the main-core and the function codes.

* * * * *